US012273588B1

(12) United States Patent
Rutledge

(10) Patent No.: US 12,273,588 B1
(45) Date of Patent: Apr. 8, 2025

(54) FEATURE ACTIVATION ON OCCURRENCE OF AN EVENT

(71) Applicant: CSC Holdings, LLC, Bethpage, NY (US)

(72) Inventor: Thomas M. Rutledge, New Canaan, CT (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 18/619,941

(22) Filed: Mar. 28, 2024

Related U.S. Application Data

(63) Continuation of application No. 17/473,528, filed on Sep. 13, 2021, now Pat. No. 11,997,350, which is a
(Continued)

(51) Int. Cl.
*H04N 21/442* (2011.01)
*H04N 5/76* (2006.01)
(Continued)

(52) U.S. Cl.
CPC ......... *H04N 21/44218* (2013.01); *H04N 5/76* (2013.01); *H04N 21/2187* (2013.01);
(Continued)

(58) Field of Classification Search
CPC .............. H04N 21/44218; H04N 5/76; H04N 21/2187; H04N 21/4147; H04N 21/4333;
(Continued)

(56) References Cited

U.S. PATENT DOCUMENTS 5,440,334 A  8/1995  Walters et al.
5,550,577 A  8/1996  Verbiest et al.
(Continued)

FOREIGN PATENT DOCUMENTS

EP  0757487 B1  6/2000

OTHER PUBLICATIONS

Scripps / Amazon Agreement Article downloaded from http://www.redorbit.com/modules/news/tools.php?tool=print&id=77 6 909, dated Feb. 7, 2007 (2 pages).
(Continued)

*Primary Examiner* — Mishawn N. Hunter
(74) *Attorney, Agent, or Firm* — Sterne, Kessler, Goldstein & Fox P.L.L.C.

(57) ABSTRACT

A cable provider could offer a promotional feature, such as live pause of video, above and beyond a tier of service to which the customer subscribes, limiting the feature to being activated only upon occurrence of one or more events. In a network video delivery context, a set-top box plays live video, including an ability to pause live video upon the occurrence of an event. The system can detect an event, including an event unrelated to video, and prompt a user to pause. The system can include configuration settings enabling, for example, detection of various events, prompting the user to pause live video, and/or automatically pausing the live video. The system enables the user to play a time-shifted video corresponding to resuming the paused video playback. The system can include a Digital Video Recorder (DVR) local to the user, to facilitate the time-shifted video. The system is also compatible with a RS-DVR, where DVR functionality and time-shifted video is provided remotely from a head-end of a network video system. Additionally, the system is compatible with non-DVR network video delivery systems configured to provide live pause.

20 Claims, 5 Drawing Sheets

Related U.S. Application Data continuation of application No. 16/173,233, filed on Oct. 29, 2018, now Pat. No. 11,122,330, which is a continuation of application No. 15/390,036, filed on Dec. 23, 2016, now Pat. No. 10,158,913, which is a continuation of application No. 13/029,687, filed on Feb. 17, 2011, now Pat. No. 9,571,782.

(60) Provisional application No. 61/305,422, filed on Feb. 17, 2010.

(51) Int. Cl.
| | | |
|---|---|---|
| *H04N 21/2187* | (2011.01) | |
| *H04N 21/4147* | (2011.01) | |
| *H04N 21/433* | (2011.01) | |
| *H04N 21/488* | (2011.01) | |
| *H04N 21/6587* | (2011.01) | |
| *H04N 21/4784* | (2011.01) | |
| *H04N 21/81* | (2011.01) | |

(52) U.S. Cl.
CPC ..... *H04N 21/4147* (2013.01); *H04N 21/4333* (2013.01); *H04N 21/44204* (2013.01); *H04N 21/4882* (2013.01); *H04N 21/6587* (2013.01); *H04N 21/4784* (2013.01); *H04N 21/812* (2013.01)

(58) Field of Classification Search
CPC ......... H04N 21/44204; H04N 21/4882; H04N 21/6587
See application file for complete search history.

(56) References Cited

U.S. PATENT DOCUMENTS

| | | | |
|---|---|---|---|
| 5,568,181 | A | 10/1996 | Greenwood et al. |
| 5,720,037 | A | 2/1998 | Biliris et al. |
| 5,721,829 | A | 2/1998 | Dunn et al. |
| 6,002,720 | A | 12/1999 | Yurt et al. |
| 6,182,128 | B1 | 1/2001 | Kelkar et al. |
| 6,233,389 | B1 | 5/2001 | Barton et al. |
| 6,801,947 | B1 | 10/2004 | Li |
| 6,985,932 | B1 | 1/2006 | Glaser et al. |
| 7,080,400 | B1 | 7/2006 | Navar |
| 7,293,279 | B1 | 11/2007 | Asmussen |
| 7,624,412 | B2 | 11/2009 | McEvilly et al. |
| 8,132,221 | B2 | 3/2012 | Malik |
| 9,571,782 | B2 | 2/2017 | Rutledge |
| 9,819,984 | B1 | 11/2017 | Neill et al. |
| 10,158,913 | B1 | 12/2018 | Rutledge |
| 11,122,330 | B1 | 9/2021 | Rutledge |
| 2001/0049820 | A1 | 12/2001 | Barton |
| 2002/0138844 | A1 | 9/2002 | Otenasek et al. |
| 2003/0044170 | A1 | 3/2003 | Haddad et al. |
| 2003/0070182 | A1 | 4/2003 | Pierre et al. |
| 2003/0097659 | A1 | 5/2003 | Goldman |
| 2003/0149988 | A1 | 8/2003 | Ellis et al. |
| 2003/0208765 | A1 | 11/2003 | Urdang et al. |
| 2003/0208767 | A1 | 11/2003 | Williamson et al. |
| 2004/0006698 | A1 | 1/2004 | Apfelbaum |
| 2004/0133923 | A1 | 7/2004 | Watson et al. |
| 2004/0187164 | A1 | 9/2004 | Kandasamy et al. |
| 2004/0194146 | A1 | 9/2004 | Bates et al. |
| 2004/0203353 | A1 | 10/2004 | Connor |
| 2004/0226034 | A1 | 11/2004 | Kaczowka et al. |
| 2004/0250282 | A1 | 12/2004 | Bankers et al. |
| 2004/0255336 | A1 | 12/2004 | Logan et al. |
| 2004/0268386 | A1 | 12/2004 | Logan et al. |
| 2005/0033850 | A1 | 2/2005 | Kirkland |
| 2005/0034171 | A1 | 2/2005 | Benya |
| 2005/0251827 | A1 | 11/2005 | Ellis et al. |
| 2006/0020993 | A1 | 1/2006 | Hannum et al. |
| 2006/0080703 | A1 | 4/2006 | Compton |
| 2006/0130116 | A1 | 6/2006 | Shi et al. |
| 2006/0140584 | A1 | 6/2006 | Ellis et al. |
| 2007/0094702 | A1 | 4/2007 | Khare et al. |
| 2007/0245384 | A1 | 10/2007 | Walter et al. |
| 2007/0263980 | A1 | 11/2007 | Chen et al. |
| 2007/0276925 | A1 | 11/2007 | LaJoie et al. |
| 2007/0294170 | A1 | 12/2007 | Vantalon et al. |
| 2008/0005770 | A1 | 1/2008 | Acharya et al. |
| 2008/0031590 | A1 | 2/2008 | Kula |
| 2008/0059645 | A1 | 3/2008 | Gregotski et al. |
| 2008/0134239 | A1 | 6/2008 | Knowles et al. |
| 2008/0134278 | A1 | 6/2008 | Al-Karmi |
| 2008/0140818 | A1 | 6/2008 | Du Breuil et al. |
| 2008/0178211 | A1 | 7/2008 | Lillo et al. |
| 2009/0029681 | A1 | 1/2009 | Clemow et al. |
| 2009/0138507 | A1 | 5/2009 | Burckart et al. |
| 2009/0317053 | A1 | 12/2009 | Morley et al. |
| 2010/0036963 | A1 | 2/2010 | Gahm et al. |
| 2010/0115567 | A1 | 5/2010 | Gupta et al. |
| 2010/0115568 | A1 | 5/2010 | Gupta et al. |
| 2010/0287580 | A1 | 11/2010 | Harding et al. |
| 2011/0200304 | A1 | 8/2011 | Rutledge |

OTHER PUBLICATIONS

AT&T Homezone Article downloaded from http://www.backchannelmedia.com/newsletter/articles/4881/ATampT-Moving-into-Cable-T . . . dated Feb. 7, 2007 (3 pages).

Adelphia Extends Partnership with Gotuit Media to Enhance On Demand Programming with Personalized Viewing downloaded from http://www.atlasventure.com/newsandevents/news.cfm?id=308&p=1dated Feb. 7, 2007 (2 pages).

Incentra Solutions, Inc. "Front Porch Digital Signs Global Reseller Agreement with Volicon" downloaded from http://www.incentrasolutions.com/print.php./sid/37/aid/159/pid/211nid/447/siteype/Incentra . . . dated Feb. 7, 2007 (3 pages).

Vividon and EMC Agree to Integrate 'Best in Class' On-demand Streaming and Centera Content Addressed Storage (2 pages).

Mostefaoui, "A modular and adaptive framework for large scale video indexing and content-based retrieval: the SIRALE system" (20 pages).

Mercer, "Keeping up with content, How to successfully manage VOD's bread-and-butter" (pp. 51-54).

Wang et al. "Optimal Proxy Cache Allocation for Efficient Streaming Media Distribution" from IEEE INFOCOM 2002 (pp. 1726-1735).

Czyrnek et al., "Large-scale multimedia content delivery over optical networks for interactive TV services" from Future Generation Computer Systems 22 (2006) pp. 1018-1024.

Non-final Office Action, dated Sep. 16, 2010, for U.S. Appl. No. 12/055,795, filed Mar. 26, 2008.

Final Office Action, dated May 5, 2011, for U.S. Appl. No. 12/055,795, filed Mar. 26, 2008.

Examiner's Answer, dated Apr. 4, 2012, for U.S. Appl. No. 12/055,795, filed Mar. 26, 2008.

Decision on Appeal, dated Nov. 26, 2014, for Appeal No. 2012-008549, relating to U.S. Appl. No. 12/055,795, filed Mar. 26, 2008.

U.S. CAFC Judgment, dated May 2, 2016, for Appeal No. 2015-1431, relating to U.S. Appl. No. 12/055,795, filed Mar. 26, 2008.

Non-final Office Action, dated May 7, 2015, for U.S. Appl. No. 14/550,566, filed Nov. 21, 2014.

Final Office Action, dated Jan. 4, 2016, for U.S. Appl. No. 14/550,566, filed Nov. 21, 2014.

Non-final Office Action, dated Mar. 8, 2017, for U.S. Appl. No. 14/550,566, filed Nov. 21, 2014.

Non-final Office Action, dated Apr. 3, 2018, for U.S. Appl. No. 15/807,328, filed Nov. 8, 2017.

U.S. Appl. No. 12/055,795, filed Mar. 26, 2008, entitled "Digital Video Recording with Remote Storage".

U.S. Appl. No. 15/390,036, filed Dec. 23, 2016, entitled "Feature Activation on Occurrence of an Event".

U.S. Appl. No. 15/807,328, filed Nov. 8, 2017, entitled "Digital Video Recording with Remote Storage".

FEATURE ACTIVATION ON OCCURRENCE OF AN EVENT

CROSS-REFERENCE TO RELATED APPLICATIONS

This application is a continuation of U.S. patent application Ser. No. 17/473,528, filed Sep. 13, 2021, which is a continuation of U.S. patent application Ser. No. 16/173,233, filed Oct. 29, 2018, now U.S. Pat. No. 11,122,330, which is a continuation of U.S. patent application Ser. No. 15/390,036, filed Dec. 23, 2016, now U.S. Pat. No. 10,158,913, which is a continuation of U.S. patent application Ser. No. 13/029,687, filed Feb. 17, 2011, now U.S. Pat. No. 9,571,782, which claims the benefit of U.S. Provisional Patent Application No. 61/305,422, filed Feb. 17, 2010, each of which is incorporated by reference herein in their respective entireties.

BACKGROUND

Field of the Invention

Embodiments relate generally to activating or enabling a feature, particularly a promotional feature, upon occurrence of a trigger event, including pausing live video, and more particularly to prompting a user to pause live video on the occurrence of an event.

Background Art

Service providers frequently offer customers additional features, above and beyond a tier of service to which the customer subscribes, for an additional fee. As selling such additional features is advantageous, it is often desirable for the service provider to effectively promote the feature to its customers. Alternatively, it may be desirable for a service provider to familiarize its customers to a new or existing feature they have, which is not widely known, appreciated or understood.

A common technique used by providers to promote features or services is a free preview. For example, a cable television provider might make a premium channel such as HBO or Showtime temporarily available to non-subscribers, in order to promote those services, and encourage customers to subscribe to them. This technique can be effective, but it has the downside of offering a very limited, and finite, period of time for customers to evaluate and consider the service. Furthermore, this technique works well for services such as broadcast linear television channels, where suddenly having many new customers using the services does not create any scaling issues. It is potentially problematic, however, if the services being promoted are on-demand services, where additional users create additional resource requirements. In this case, implementing a free preview period may require the service provider to build out expensive new infrastructure to support demand that is much higher than is required for normal operation. Alternatively, the free preview may create demand at a level that cannot be satisfied by existing infrastructure, creating a bad customer experience that undermines the promotional intent.

The conventional Digital Video Recorder, or DVR, is a one type of service that has can be offered by multi-channel video providers, such as a cable providers. DVRs can provide a user/viewer with the ability to pause live video and/or audio, including live television, for example, using a specialized set-top box (STB) deployed at the user's home. DVR capability can also be implemented remotely from the user, for example at the headend of a network video system configured to provide video. This type of DVR is referred to herein as a remote storage DVR or RS-DVR system. In contrast to conventional DVR systems, which store programs locally, RS-DVR systems store video remotely from the user. One such network RS-DVR is described in U.S. patent application Ser. No. 12/055,795 ("the '795 application"), filed on Mar. 26, 2008, which is entitled "Digital Video Recording with Remote Storage." The '795 application is incorporated by reference in its entirety.

In conventional DVR and RS-DVR systems, a user must determine at what point it would be desirable to pause live video/audio/television. For example, a user may decide to manually pause live video when the user becomes aware of an event (e.g., doorbell chime, telephone ring). To decide, the user determines whether an event has occurred (if possible), and identifies details of the event (if possible) and whether the event merits the user's attention.

Accordingly, a user may reduce a volume level of live video, to enable the user to listen for an event, for example, resulting in self-imposed diminished enjoyment of live video. Even with such precautions, the user may suffer diminished enjoyment of the live video, due to preoccupation over whether an expected event will be missed while watching live video. The user may also be unable to identify details of an event that the user notices, forcing the user to guess at whether to pause live video based on incomplete information regarding the event. A user may pause live video for the purpose of determining additional details of the event, only to discover that the event does not merit attention or pausing of the live video. A user may place such priority on some types of events such that the user will always prefer to pause live video, and therefore desire the ability to configure a system to automatically pause upon the occurrence of such a high-priority event.

Additionally, users of non-DVR video systems, including non-DVR network video systems, typically do not have the option to pause live video. When an event occurs while viewing live video in a non-DVR video system, a user must determine whether to attend to the event and therefore become distracted from, or miss entirely, the live video.

Furthermore, users of DVR and non-DVR systems can become engrossed in live video and fail to become aware of an event that the user would otherwise be capable of perceiving. The user may enjoy live video at a volume level that masks the sound of an event, thereby rendering the event imperceptible to the user. The user may simply fail to perceive, or fail to become aware of, an event, for various reasons, while viewing live video.

What is needed is a more effective technique to promote features and services, including those related to DVR functionality, to consumers, avoiding the pitfalls of the above-described techniques.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. In the drawings.

The present embodiments will now be described with reference to the accompanying drawings. In the drawings, like reference numbers may indicate identical or functionally similar elements.

DETAILED DESCRIPTION

Figure 1:
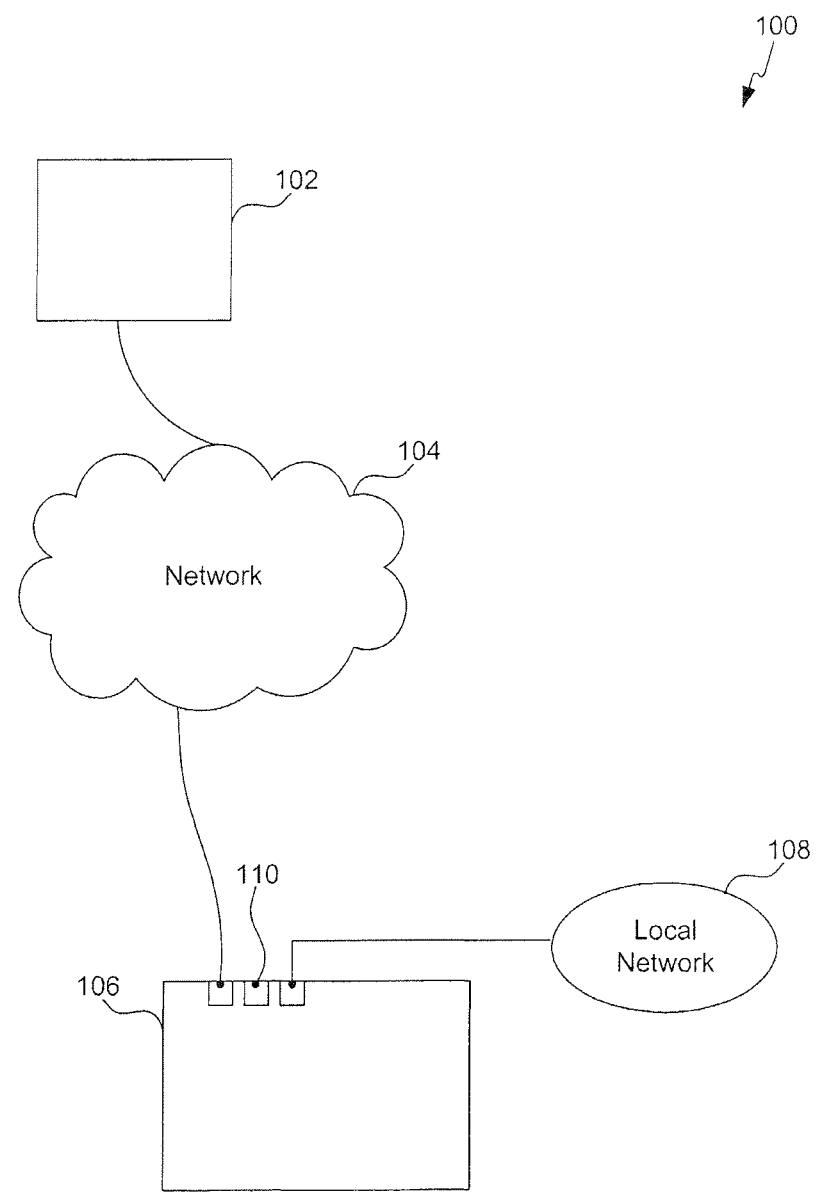
FIG. 1 is a block diagram of an architecture of a network video delivery system.

While the present invention is described herein with reference to illustrative embodiments for particular applications, it should be understood that the invention is not limited thereto. Those skilled in the art with access to the teachings provided herein will recognize additional modifications, applications, and embodiments within the scope of the invention and additional fields in which the invention would be of significant utility.

The invention comprises a system that selectively enables or activates a feature only upon the occurrence of a specific trigger event. Enabling or activating the feature in this fashion, together with appropriate notification to the user, allows the feature to be promoted to the user on a regular and ongoing basis. The promotion may occur in a context where the feature is especially relevant, so that it is less likely to be ignored, like normal advertising. The ongoing nature of the promotion allows the customer an extended or indefinite period of time to become familiar with the feature, and come to understand its value proposition. At the same time, because the feature is activated or enabled only upon a specific trigger, it is not always available to the customer, and the value of upgrading to purchase the unlimited feature remains intact.

Furthermore, by limiting utilization of the feature to specific trigger events, aggregate demand for infrastructure resource may be kept significantly lower than if all users were simply allowed unlimited use of the feature, for a period of time.

As an example, consider a Live Television Pause feature provided by cable television service provider. Digital Video Recorders, or DVRs, have long allowed television viewers to temporarily pause live television, and then continue viewing from where they paused, after a period of time. Using more recent technology, a cable television provider might enable a Live Television Pause function even for non-DVR cable set-top boxes, using a remote, headend-based DVR technology.

If the provider wishes to promote such a new feature, it might offer a traditional free preview. However, this would present the provider with the disadvantages described above, and in particular, would potentially require a very large and expensive infrastructure investment to be able to support all customers using an unlimited Live Pause function, for just a limited period of time.

As an alternative, the cable television provider might offer customers a limited version of the feature, enabled only upon the occurrence of a specific trigger event. For example, if the cable television provider offers a triple-play bundle including voice telephony service, it is likely to provide a Caller ID on TV feature, whereby incoming calls generate an on-screen display of the incoming caller ID information, on the viewer's television. A phone call being one example (of many) of an interruption that might make it desirable for a viewer to pause live television, this could be an effective trigger event for promoting a Live Television Pause feature.

One embodiment of the invention may consist of enabling the Live Television Pause feature for a limited period of time, commencing with reception of a Caller ID on TV message. In a preferred embodiment, the enablement interval may equal the period of time during which the Caller ID on TV display is active onscreen. The preferred embodiment may supplement the normal Caller ID on TV display with additional messaging indicating the availability of the Live TV Pause function—for example, directing the viewer that they may press the pause button on a remote control to pause live television—thus ensuring that the viewer is made aware that the feature is available for use.

In another embodiment, an interactive advertisement may incorporate the ability to telescope to additional advertising content, and the system may automatically enable the Live Television Pause function upon reception of the interactive advertisement, or alternatively, may automatically activate the Live Television pause function upon the viewer's activation of the telescoping feature. This embodiment may both serve the purpose of promoting the Live Television Pause feature to the subscriber and also promoting utilization of the advanced advertising functionality.

Live pause includes the ability to pause a broadcast stream, or live video, while capturing/buffering the live video during a pause state, for time-shifted playback after the pause state. Live pause can be supported on a set-top box (STB) regardless of set-top box model or make, or whether the STB includes a local DVR functionality. Live pause can be implemented using a RS-DVR system. RS-DVR is a server-based architecture for capturing and streaming video that allows for DVR service to be turned on and integrated in a STB at a locality. Live pause can therefore be implemented on all STBs at a locality, including DVR and non-DVR STBs. The STBs can be linked to communicate with other STBs, a local network, and/or automated or "smart" features at a locality. All STBs in a locality can be enabled for live pause, which can be activated from any unique STB in the locality.

FIG. 1 illustrates a block diagram of an architecture of a network video delivery system 100, including headend 102, network 104, and STB 106. Many additional set-top boxes can be used with the system 100, although only STB 106 is illustrated. STB 106 is coupled to a headend 102 through communication links or network 104. Exemplary STB 106 can include, without limitation, an Internet Protocol (IP)-based (i.e., IPTV) STB. Embodiments are not limited to these exemplary STBs, and it would be apparent to those skilled in the art that other STBs can be used in embodiments described herein.

A remote control (not shown) may be used to control operation of STB 106. Some set-top boxes may have controls thereon not requiring the use of a remote control. The remote control is configured with buttons to control the STB 106, including play, pause, stop, etc. The remote control can also be configured with mouse like functionality to allow selection of certain icons, for example, on the displayed video. The video could include, for example, advertisements that are displayed in a dialogue box or specific area of the displayed video. The selection of an icon could result in activation of a feature such as pause of the video.

The headend-based system 100 includes a server (not shown) that receives media (e.g., a video stream) provided by content providers. The media is typically received via satellite or terrestrial feed in digital form, and headend 102 is configured to deliver media, including video, to STB 106. In an embodiment, a buffer is connected to the server to temporarily store a copy of the media. The temporary storage of the media allows a user to transmit commands to the headend 102 to alter playback of the media. Embodiments include DVR systems, including a local DVR system wherein STB 106 includes local DVR features, and a RS-DVR system wherein headend 102 provides enhanced manipulation of video streams. Embodiments also include non-DVR systems, wherein neither the headend 102 nor the STB 106 provides full DVR functionality. In the various DVR and non-DVR embodiments, the headend 102 can be configured to deliver events, including caller ID telephone prompts, advertisements, data, and other events unrelated to video delivery. Thus, STB 106 can be configured to receive an indication of an event from headend 102, e.g., via network 104. For example, STB 106 can receive a caller ID telephone prompt via an IP telephone system or voice over IP (VOIP) telephone system implemented with the headend 102.

STB 106 can be configured to interface with a local network 108. Local network 108 can provide wired and wireless connectivity with various networks and network-enabled devices, including computers, the Internet, telephones, home appliances, and other systems for lighting, temperature control, multi-media, security, window and door operations, and many other functions. Accordingly, STB 106 can receive an indication of an event via local network 108.

STB 106 can provide additional connectivity 110, which can be used to interface with additional devices and networks such as analog telephones, X10 and other home automation communications, and the like. Accordingly, STB 106 can receive signals, including an indication of an event, via additional connectivity 110. Additional connectivity 110 can include wireless communication functionality, and can be built-into the STB 106.

STB 106 can be configured to receive/detect an event via headend 102/network 104, local network 108, and additional connectivity 110. Events can include, for example, a caller ID prompt received from headend 102, an e-mail received through local network 108, or a doorbell/security camera notification received through additional connectivity 110, for example. Events can include any type of situation where a viewer prefers to be prompted to pause live video, including situations involving audio, video, security, HVAC, lighting, intercom, appliance, garage door, pet door, coffee pot, robotic servant, and the like. In short, a cable provider could offer live pause, above and beyond a tier of service to which the customer subscribes, for promotional purposes, limiting the live pause to being activated only upon occurrence of one or more of these events.

The STB 106 can be configured to selectively detect and/or ignore various events. For example, the STB 106 can be configured to detect telephone calls/caller ID prompts and security camera feeds associated with a doorbell ring, while ignoring events associated by the user with, for example, low priority events (e.g., appliances including a conventional oven, a dishwasher, and a washer/dryer).

Live pause also can involve determining whether an event is associated with a prompt, and prompting for a first user input. For example, the STB 106 can be configured to detect emails, but only prompt a user in the event the email is marked as urgent or is received from a specific sender, such as a family member. The STB 106 can be configured to prompt based on category. For example, the STB 106 can be configured to prompt for silent events that would otherwise go unnoticed by the user, e.g., prompt when a washing machine completes its cycle and sends a signal to the STB 106 via the local network 108 and/or the connectivity 110. The invention is not limited to activating the feature upon activation of an input. The activation could be automatic (e.g., automatically pausing or buffering a video upon occurrence of an event).

A prompt, e.g., a pause prompt for a first input, can be displayed for a user in response to the event. The pause prompt can include information relating to the event. Such information enables a user to determine whether the event warrants pausing live video. For example, the pause prompt can include a telephone number and name associated with caller ID information. The pause prompt can include a live video feed from a security camera upon receiving a doorbell ring. The pause prompt can also include instructions for the user. For example, the pause prompt can instruct the user to press a specific button to pause the program. The pause prompt can also instruct the user that the live pause ability is enabled, in response to the event and/or pause prompt.

The STB 106 (or headend 102) can be configured to automatically pause live video in response to detecting certain events, including determining details relating to the event. For example, the STB 106 can be configured to automatically pause when receiving an emergency telephone call, or receiving a signal from a smoke detector or carbon dioxide detector. Accordingly, the user can be notified of an important event, reducing the likelihood that the user would otherwise have missed the event while interacting with STB 106.

The pause prompt can be displayed for a time, referred to as a pause prompt duration. The pause prompt duration provides the user a window of opportunity to pause. At the expiration of the pause prompt duration, the system can automatically clear the pause prompt from the live video, without needing participation by the user, according to user-configurable system preferences. The system can also incorporate a "clear" feature that enables the user to manually clear the pause prompt from the screen using, for example, a command issued from the remote control.

The pause prompt duration is configurable. For example, the pause prompt duration can be set to ten seconds. The pause prompt duration can effectively be disabled by setting the duration to zero, and the pause prompt can be permanently displayed by setting the duration to endless (wherein subsequent prompts overwrite previous prompts, and the user can manually clear prompts). The pause prompt also can be configured to remain on screen or be cleared, even when the user changes channels (i.e., changes to a different video stream) during display of the pause prompt.

The pause prompt can be associated with limitations. For example, the system can be configured to require an event that triggers a pause prompt, in order to enable the live pause ability. Accordingly, live pause can be disabled at times when the user is not prompted by an event, limiting availability of live pause to times only when an event has occurred. For example, limiting availability of live pause for users of non-DVR systems can reduce a need for expanded capacity at the headend 102, because the headend 102 responds to a reduced number of requests to provide time-delayed video streams corresponding to live pause requests.

The pause prompt can incorporate display effects. For example, the prompt can transition in a wiping motion from left to right onto a display (not shown) of the STB 106.

Figure 2:
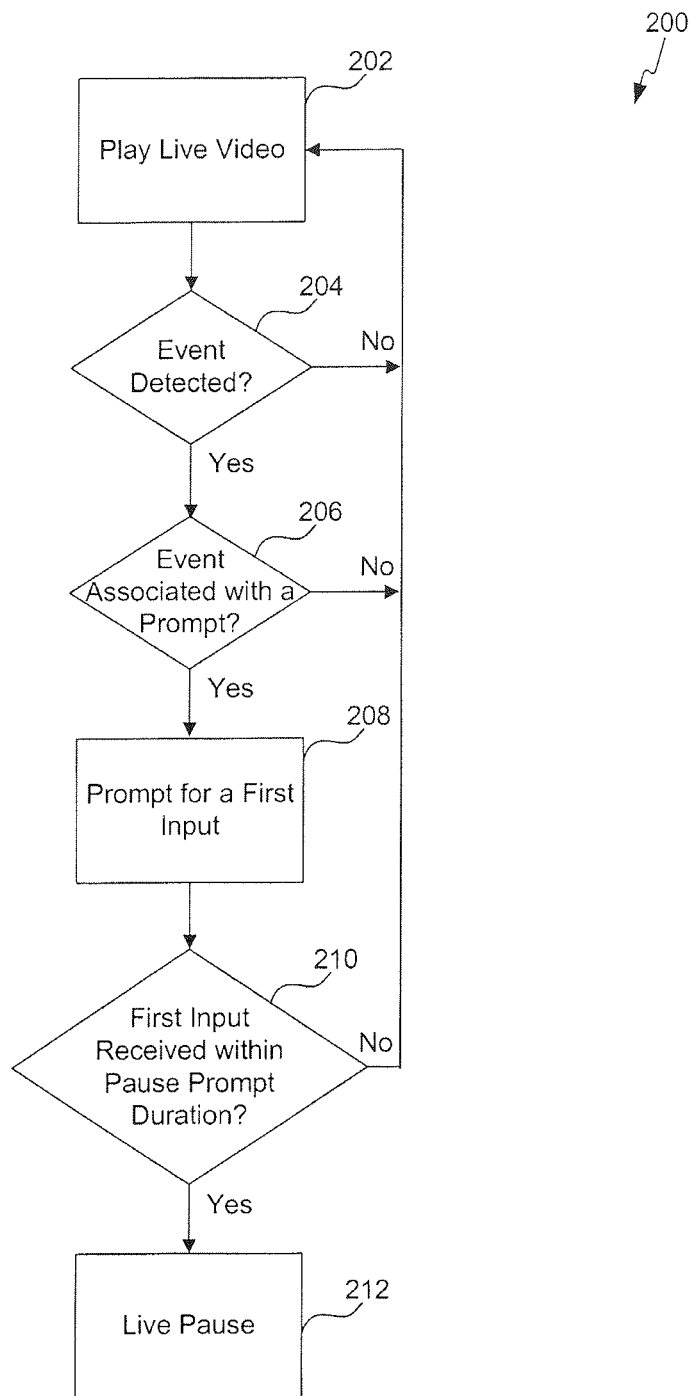
FIG. 2 is an example flow chart of a method of transitioning from live video to live pause according to an embodiment.

FIG. 2 is an example flow chart 200 illustrating a method of transitioning from live video to live pause according to an embodiment. Embodiments of the invention could, of course, incorporate an almost unlimited variety of features, and in particular promotional features, and an almost unlimited variety of triggering events. Live pause is used merely for illustrative purposes. For example, the ringing of a doorbell or activation of a motion sensor can trigger video camera positioned at the door. The video can then be automatically displayed on a customer's television, and optionally live pause could also be automatically invoked.

Flow chart 200 begins at step 202, during which the system plays live video. In step 204, the system determines whether an event is detected. For example, the system can determine that a telephone call is being received, associated with caller ID information. If an event is not detected, the system returns to step 202 and displays live video. If an event is detected, the system proceeds to step 206. In step 206, the system determines whether the event is associated with a prompt. For example, the system checks system configuration settings associated with prompts. If the event is not associated with a prompt, the system proceeds to display live video at step 202. If the event is associated with a prompt, the system proceeds to step 208.

In step 208, the system prompts for a first input. For example, the system can display information associated with the caller ID event (e.g., a caller's name and telephone number), and instruct the user to press "Pause" in order to pause the live video. In step 210, the system determines if the first input was received within a pause prompt duration. For example, the system can provide a ten second "window of opportunity" duration for responding to live pause, during the prompt for a first input. If the first input was not received within the pause prompt duration, the system proceeds to display live video at step 202. If the first input was received within the pause prompt duration, the system proceeds to step 212. In step 212, the system performs a live pause and pauses live video.

Limitations can be applied to the ability to pause and resume live video. For example, the system can include the limitation that once a broadcast stream is paused, it can only be un-paused from that same unique STB 106 within the locality/household. The system can also provide the limitation that subsequent prompts are suppressed during the paused state. Live pause can also include a limit to pause duration of the live pause, for example a live pause limit of five minutes. The pause duration can be limited regardless of video remaining to be watched for the paused video, and regardless of whether the pause spans across the end of one video to the beginning of the next video. Live pause can be limited to displaying the currently tuned video/channel, such that pause is terminated and live video is resumed upon tuning to another video/channel. The pause prompt can be modal such that it abides by a modal timeout in the case of tuning away from the paused state. The system can also be configured to selectively ignore various commands/keys during live pause (e.g., 10-key behavior).

Figure 3:
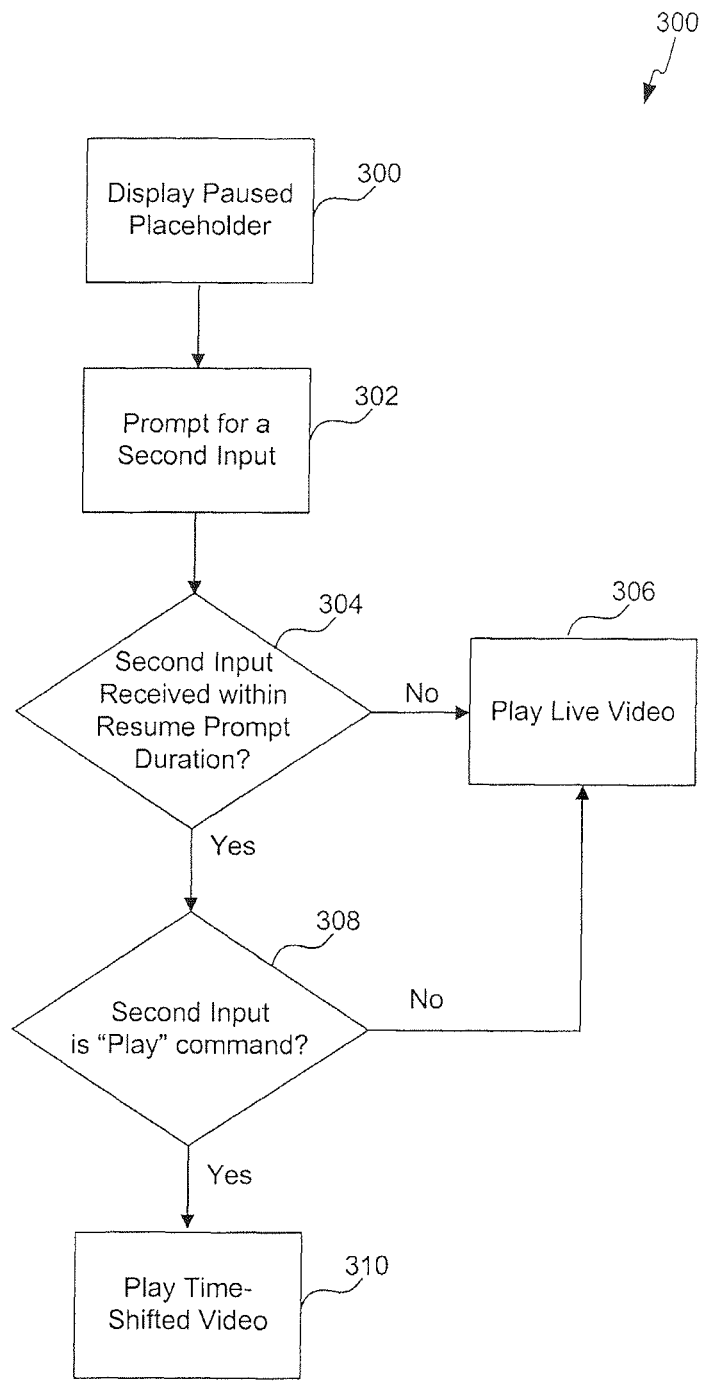
FIG. 3 is an example flow chart of a method of transitioning from live pause to time-shifted video according to an embodiment.

FIG. 3 is an example flow chart 300 illustrating a method of transitioning from live pause to time-shifted video according to an embodiment. In step 301, the system displays a paused placeholder. In step 302, the system prompts for a second input. For example, the system can display a "Now Paused" prompt associated with the paused placeholder, replacing the pause prompt (e.g., displayed in step 208). The "Now Paused" prompt can be associated with the prompt for a second input, instructing the user to press "Play" to switch to time-shifted video. In step 304, the system determines if the second input was received within a resume prompt duration. If the second input was not received within the resume prompt duration, the system returns to live video in step 306. If the second input was received within the resume prompt duration, the system proceeds to step 308. In step 308, the system determines whether the second input is a "play" command. If the second input is not a "play" command, the system plays live video at step 306. If the second input is a "play" command, the system plays time-shifted video in step 310.

As illustrated in step 301, the system can implement live pause by displaying a paused placeholder. The system can also perform a silent tune or shadow tune to a predefined playback channel [e.g., 1500] for placeholder functionality. The silent/shadow tune can be transparent to the viewer, enabling a front panel display (not illustrated) of the STB 106 to remain unchanged from current tuned channel information. The "Pause" prompt (e.g., step 208) can be replaced by the paused placeholder, which can include the information "Now Paused." The prompt/placeholder can transition between "Pause" to "Now Paused" at the point the user initiates a command (e.g., remote pause button press) during the "window of opportunity" associated with the prompt for a first input.

The paused placeholder can include a full-screen graphic. For example, the system can display a screen-capture associated with the live video that is currently paused. The placeholder graphic can also support dynamic text display, wherein information relating to the paused video/program can be retrieved from a programming scheduling guide for insertion in the placeholder graphic, at the time the placeholder graphic is displayed. The information can identify the paused video/program, current at the time of the live pause. The information can also be updated to reflect, for example, the underlying tuned video/channel as time passes, indicating that live video has moved on to a next scheduled program. Other information relating to the programming scheduling guide can be displayed as it updates over time, as well as information including advertising, status indications from the headend 102, local network 108, and additional connectivity 110, for example.

The paused placeholder can inform the user that live video is paused, and provide additional information including a maximum pause time, for example five minutes, as to how long the pause will be held corresponding to the resume prompt duration of step 304. In embodiments with live pause limitations, such as the five minute resume prompt duration, the paused placeholder can also display a count-down timer of remaining time allowed for pause before the system automatically reverts to playing time-shifted video or playing live video.

In step 308 of the embodiment illustrated in FIG. 3, the system determines whether the second input is a "play" command. Alternate embodiments can determine whether the second input includes commands in addition to a "play" command. For example, an alternate embodiment can determine whether the second input is an "Info" command, a "Live Video" command, or other commands. Handling additional commands enables the paused placeholder to interact with the user, for example, by displaying additional information in response to the user pressing the "Info" key or other commands during display of the placeholder. Such additional responses are contemplated, although not specifically illustrated in FIG. 3.

For example, upon receiving an "Info" command during live pause state, the system can display an informational banner. The informational banner can include programming guide information at the time of the pause. The programming guide info can include, e.g., the tuned channel that was put into the paused state. Thus, the informational banner can act as the on-screen display response for an "Info" key press in live paused state. Once invoked, receiving a second "Info" command instructs the system to clear the informational banner. The informational banner can be cleared automatically after a duration, e.g., seven seconds. If the user presses "Play" during display of the informational banner to enter time-shifted playback, then the informational banner is cleared along with other graphic elements upon launching the time-shifted playback stream. The informational banner can be associated with a banner display timer applied at invocation of the informational banner display, such that the informational banner is automatically cleared at the expiration of the banner display timer (e.g., 5-7 seconds).

The system typically can include a user interface (UI) menu for displaying and receiving, e.g., system configuration settings. Upon receiving a command that invokes a UI menu during live paused state, the system can implement a UI menu scaled window. For example, the system can display a "scaled" placeholder graphic within the UI menu. The associated "pause" timer associated with the full screen paused placeholder graphic, and the timer associated with the resume prompt duration, can continue to countdown, even if actual graphics are replaced and/or suppressed by the UI menu. When the resume prompt duration timer expires within the scaled window, the paused placeholder graphic can clear and the system can return to live video scaled within the UI menu scaled window view. If the user manually exits the scaled view, then any "scaled" placeholder graphics can be replaced with the full screen live paused placeholder graphic and "Now Paused" or "Play" prompt overlay still within the timer window. If the user presses "Play" to launch the time-shifted playback in a scaled TV window, then the placeholder graphic and UI menu screen are both torn down and the time-shifted playback can launch full screen.

Transitioning to live pause, e.g., displaying the paused placeholder in step 301, can be associated with creating a time-shifted video stream in anticipation of switching to time-shifted video. In non-DVR and RS-DVR video systems, for example, a time-shifted video stream can be created and buffered at the headend 102. In systems utilizing conventional STB DVRs, the time-shifted video stream can be buffered at the DVR. The time-shifted video stream can be deleted when the system returns to live video, e.g., at the end of the time-shifted video stream, or upon expiration of the resume prompt duration or receipt of a cancel (non-"Play") command during the resume prompt duration, even without the system ever switching to time-shifted video.

The prompt for a second input (e.g., step 302) can request that the user press "Play" to switch from live pause to time-shifted video playback. The prompt for a second input can be displayed simultaneously with, or delayed with respect to the paused placeholder. The system can include a transition effect associated with the prompt for a second input. For example, the system can display "Now Paused" (or the equivalent) for a time (e.g., five seconds), before transitioning to "Press Play" (or the equivalent) associated with the prompt for a second input. The "Now Paused" display can be associated with the paused placeholder. The system can also implement the "Now Paused" display by using an updating prompt for a second input that transitions to "Press Play." The system can utilize a transition time, e.g., ten seconds, for automatically transitioning the display from "Now Paused" to "Press Play."

In embodiments including limitations on pause duration, the system tolls a timer associated with displaying the prompt for a second input. Upon expiration of the timer, the system can automatically return to live video. Alternatively, the system can be configured to switch to time-shifted video upon expiration of the resume prompt duration. Returning to live video can involve clearing prompts from the display such that live video is unimpeded.

The system checks for user input during the resume prompt duration (e.g., step 304). For example, the system can receive a "Clear" command and remove the prompt for a second input and return to live video. Alternatively, the system can be configured to ignore commands other than "Play," for example, during the resume prompt duration. Upon receiving a "Play" command, or other similar command, the system switches to time-shifted video.

The prompt for a second input, e.g., "Press Play to resume" or "Play to resume" message, can be a user interface element used to instruct the viewer on how to resume the video after it has been manually put into a paused state. The event alert display, e.g., Caller ID alert, can be transitioned off prior to display of the "Play" prompt, depending on timer configurations of the various prompts. For example, the event alert display can be associated with a ten second modal timer, and can be configured to be over-ridden by commands such as Power, Standby, Tune, etc. The prompt for a second input can immediately replace the "Now Paused" prompt when a timer associated with the pause prompt duration expires. The "Resume" prompt for a second input can display for a remaining length of the resume prompt duration. The resume prompt duration can be reduced to accommodate the preceding "Now Paused" prompt display and associated timer. At timer expiration of the resume prompt duration, all prompts and buffered stream capture can be cleared and the system can go directly to live video.

Figure 4:
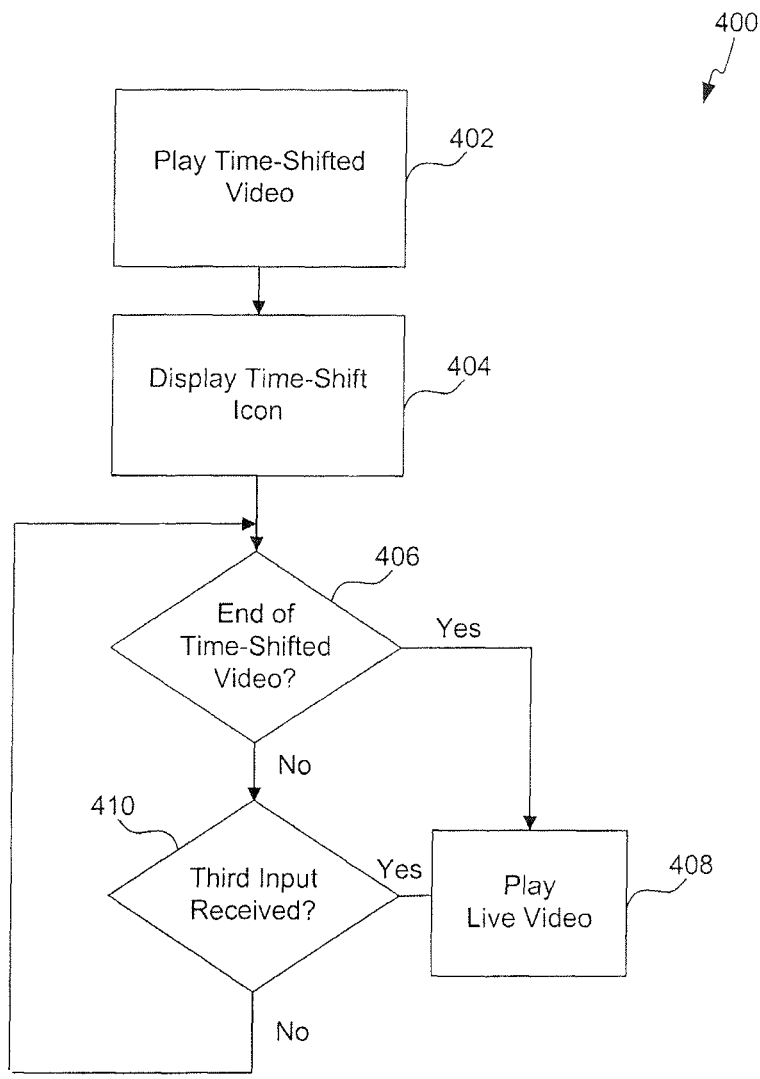
FIG. 4 is an example flow chart of a method of transitioning from time-shifted video to live video according to an embodiment.

FIG. 4 is an example flow chart of a method of transitioning from time-shifted video to live video according to an embodiment. The method begins at step 402, play time-shifted video. Although the illustrated embodiment associates a transition from a paused state to time-shifted video with a "play" command, alternative embodiments can associate additional commands and functionality when transitioning from a paused state. For example, the system can transition from a paused state to time-shifted video in response to a "Fast Forward" command. Accordingly, in such embodiments, the time-shifted video is presented in fast forward speed, without needing to receive a "play" command. Additional commands associated with trick play modes (e.g., "slow") can be supported for transitioning from paused state to time-shifted video, although not specifically illustrated in FIG. 4. The system is therefore not limited to transitioning to time-shifted video in response to a "play" command. The system can also support trick play modes during playback of time-shifted video, after having transitioned from the paused state.

The method proceeds from step 402 to step 404, and the system associates a time-shift icon with the displayed time-shifted video. For example, the system can display or overlay the time-shift icon over the time-shifted video at the lower left of the screen. The method proceeds to step 406, and the system checks for an end of time-shifted video. If the system detects an end of time-shifted video, the system proceeds to step 408 and resumes live video. If the time-shifted video is not at an end, the system checks whether a third input is received at step 410. For example, the system checks for a "Stop" command, "Live Video" command, change channel (e.g., up/down) command, or the like. If a third input is not received (or the third input is not among the accepted commands associated with a transition to live video), the system loops back to step 406. If an accepted third input is received, the system proceeds to step 408 and resumes live video. Additionally, the system can also be configured to transition from any state to playing live video upon receiving a "Live Video" command, "Change Channel" command, or the like.

A time-shift icon can be displayed (step 404) to indicate that time-shifted video is playing. For example, the icon can be represented by a small triangle enclosed by a circle. Playback of time-shifted video begins at the paused point of the video. The time-shift icon can be overlaid, for example on the time-shifted video in the lower-left of the screen. The time-shift icon can be displayed for all time-shifted streaming video due to live pause action, including time-shifted streaming video displayed by non-DVR STBs. The time-shift icon can be displayed for the entire duration of the time-shifted playback. The time-shift icon enables the user to distinguish between a standard/live broadcast, and a time-shifted playback delayed in time relative to live video broadcast from the headend 102.

An "Info" command can provide information regarding the time-delayed stream, even if the live video broadcast of the currently tuned channel has transitioned to a new program. During time-shifted playback, the system can respond to an "Info" command or the like by displaying a UI message time-shift banner. The time-shift banner can dynamically pull information for insertion into the time-shift banner associated with the time-shifted playback. For example, the time-shift banner can display information relating to the program state and instructions on how to stop the playback.

The time-shift banner can also support additional information including programming information from a program scheduling guide, such as the program name, duration, actors, rating, and the like. Such information can be stored by the system at the time of buffering/recording the time-shifted video. Accordingly, the time-shift banner information is accurate for the time-shifted video, even if the scheduling information is no longer live due to the time-shift. The time-shift banner can be cleared by a subsequent "Info" or "Clear" command. The time-shift banner can also be associated with a banner display timer applied at invocation. The banner display timer is configurable and, for example, can be set equal to, e.g., 5-7 seconds.

During time-shifted playback, the system continues monitoring and detecting events. The system can be configured to suppress the display of event alerts in response to detecting events, e.g., Caller ID Alerts, to prevent the event alerts from displaying over time-shifted playback. For example, the system can be configured to automatically pause in response to specific and/or preconfigured types of detected events (e.g., a fire alarm signal), such that it is not necessary to solicit feedback from the user and/or display an event alert. The system can be configured to ignore various commands during time-shifted playback. For example, the system can ignore pause (or any commands related to trick play modes) during time-shifted playback. The system can ignore all commands except "Stop" (returns to live video) and/or "Info" (displays time-shift banner), including selectively ignoring various keys during time-shifted playback (e.g., 10-key behavior).

Upon ending the time-shifted playback, the system plays live video (step 408) from the headend 102. For example, the system plays live video at the currently tuned channel. The system can be configured to limit time-shifted video buffering and/or playback, such that time shifted video playback ends after a finite time period. For example, the time-shifted playback can end after the entirety of the time-shifted program has been played, or after a number of minutes of time-shifted viewing, for example, or after other events. Other events can include the system detecting the beginning of a commercial break during time-shifted playback. The system can end time-shifted playback in response to detecting the beginning of a commercial break in the time-shifted video. Resuming live video can have the effect of skipping over some or all of the commercial break, depending upon the time-shift offset from live and the duration of the commercial break).

As set forth above, the system can implement live pause using a silent/shadow tune functionality. For example, the system can silently/shadow tune to a different channel for displaying time-shifted video, in response to live pause commands, without specifically notifying the user that a channel tune is occurring. Similarly, the system can handle the return to live video (step 408) transparently relative to the user, e.g., the front panel display of the STB 106 (that typically displays the current channel information and other status information) can remain unchanged on return to live video. The buffered/recorded video stream used for time-shifted playback can be temporary and not stored once time-shifted playback has ended or is stopped in any way.

Figure 5:
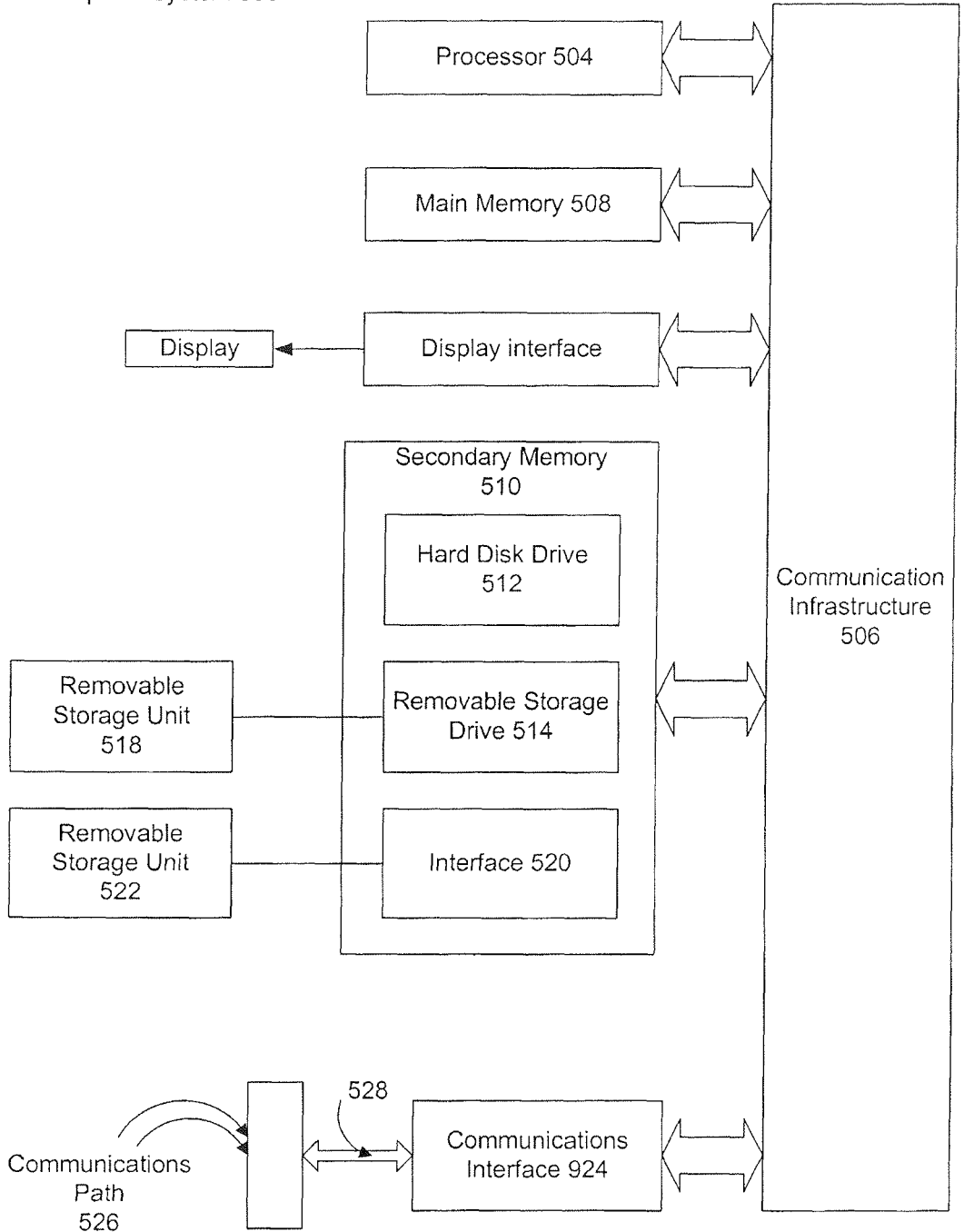
FIG. 5 is a block diagram of an exemplary computer system on which embodiments can be implemented.

FIG. 5 is a schematic diagram of an example computer system 500 used to implement embodiments of the STB 106 and/or headend 102. Various aspects of the various embodiments can be implemented by software, firmware, hardware, or a combination thereof. FIG. 5 illustrates an example computer system 500 in which an embodiment, or portions thereof, can be implemented as computer-readable code. Various embodiments are described in terms of this example computer system 500. After reading this description, it will become apparent to a person skilled in the relevant art how to implement embodiments using other computer systems and/or computer architectures.

Computer system 500 includes one or more processors, such as processor 504. Processor 504 can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. Secondary memory 510 may include, for example, a hard disk drive 512 and/or a removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well known manner. Removable storage unit 518 may comprise a floppy disk, magnetic tape, optical disk, etc. which is read by and written to by removable storage drive 514. As will be appreciated by persons skilled in the relevant art(s), removable storage unit 518 includes a tangible computer readable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (e.g., an Ethernet card), a communications port, a PCMCIA slot and card, or the like. Software and data transferred via communications interface 524 are provided to communications interface 524 via a communications path 526. Communications path 526 may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement embodiments as discussed herein, such as the system described above. In particular, the computer programs, when executed, enable processor 504 to implement the processes of embodiments. Accordingly, such computer programs represent controllers of the computer system 500. Where embodiments are implemented using software, the software may be stored in a computer program product and loaded into computer system 500 using removable storage drive 514, interface 520, hard drive 512 or communications interface 524.

Described above are systems, apparatuses, and methods for live pause on occurrence of an event, and applications thereof. It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor, and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for activating an existing feature associated with a service that is offered by a service provider, the method comprising:
   disabling, by a set-top box, the existing feature until an occurrence of an event, the existing feature not included in a tier of service that is associated with a user of the service;
   activating, by the set-top box, the existing feature for a limited period of time in response to the occurrence of the event;
   allowing, by the set-top box, the user to use the existing feature during the limited period of time;
   disabling, by the set-top box, the existing feature upon expiration of the limited period of time; and
   activating, by the set-top box, the existing feature after the expiration of the limited period of time in response to the tier of service being upgraded to include the existing feature.

2. The method of claim 1, wherein the event comprises:
   a receipt of a telephone call;
   a receipt of a caller identification (ID) telephone prompt;
   a receipt of an electronic message; or
   a receipt of a doorbell notification or a security camera notification.

3. The method of claim 1, wherein the activating comprises enabling the existing feature to be activated during an enablement interval in response to the occurrence of the event.

4. The method of claim 3, wherein the enablement interval comprises a prompt duration, and
   wherein the activating further comprises:
      displaying, by the set-top box, a prompt during the prompt duration to indicate an availability of the existing feature and information relating to the event in response to the occurrence of the event;
      receiving, by the set-top box, an input from the user during the enablement interval in response to the displaying; and
      performing, by the set-top box, the existing feature in response to receiving the input from the user.

5. The method of claim 4, wherein the prompt comprises:
   a telephone number and name associated with a caller identification (ID) telephone;
   a live video feed from a security camera; or
   an instruction for the user, or
   wherein the input comprises:
      an indication of a button press by the user on a remote control that is associated with the set-top box; or
      a selection of an icon by the user from video being displayed by the set-top box.

6. The method of claim 1, further comprising:
configuring the set-top box to detect one or more first events from among a plurality of events and to ignore one or more second events from among the plurality of events, and
wherein the event is from among the one or more first events.

7. The method of claim 6, wherein the one or more second events comprise:
a receipt of an electronic message related to operation of an appliance;
a receipt of an electronic message that is not marked as urgent; or
a receipt of an electronic message that is not received from a specific sender.

8. A set-top box for activating an existing feature associated with a service that is offered by a service provider, the set-top box comprising:
a memory that stores instructions; and
a processor configured to execute the instructions, the instructions, when executed by the processor, configuring the processor to:
disable the existing feature until an occurrence of an event, the existing feature not included in a tier of service that is associated with a user of the service,
activate the existing feature for a limited period of time in response to the occurrence of the event,
allow the user to use the existing feature during the limited period of time,
disable the existing feature upon expiration of the limited period of time, and
activate the existing feature after the expiration of the limited period of time in response to the tier of service being upgraded to include the existing feature.

9. The set-top box of claim 8, wherein the event comprises:
a receipt of a telephone call;
a receipt of a caller identification (ID) telephone prompt;
a receipt of an electronic message; or
a receipt of a doorbell notification or a security camera notification.

10. The set-top box of claim 8, wherein the instructions, when executed by the processor, configure the processor to enable the existing feature to be activated during an enablement interval in response to the occurrence of the event.

11. The set-top box of claim 10, wherein the enablement interval comprises a prompt duration, and
wherein the instructions, when executed by the processor, configure the processor to:
display a prompt during the prompt duration to indicate an availability of the existing feature and information relating to the event in response to the occurrence of the event;
receive an input from the user during the enablement interval in response to the displaying; and
perform the existing feature in response to receiving the input from the user.

12. The set-top box of claim 11, wherein the prompt comprises:
a telephone number and name associated with a caller identification (ID) telephone;
a live video feed from a security camera; or
an instruction for the user, or
wherein the input comprises:
an indication of a button press by the user on a remote control that is associated with the set-top box; or
a selection of an icon by the user from video being displayed by the set-top box.

13. The set-top box of claim 8, wherein the instructions, when executed by the processor, further configure the processor to configure the set-top box to detect one or more first events from among a plurality of events and to ignore one or more second events from among the plurality of events, and
wherein the event is from among the one or more first events.

14. The set-top box of claim 13, wherein the one or more second events comprise:
a receipt of an electronic message related to operation of an appliance;
a receipt of an electronic message that is not marked as urgent; or
a receipt of an electronic message that is not received from a specific sender.

15. A set-top box for activating an existing trick play mode associated with a service that is offered by a service provider, the set-top box comprising:
a communications interface configured to receive a broadcast stream from the service provider; and
a processor coupled to the communications interface, the processor being configured to:
playback the broadcast stream on a display device;
disable the existing trick play mode until an occurrence of an event, the existing trick play mode not included in a tier of service that is associated with a user of the service,
activate the existing trick play mode for a limited period of time in response to the occurrence of the event,
allow the user to use the existing trick play mode during the limited period of time,
disable the existing trick play mode upon expiration of the limited period of time, and
activate the existing trick play mode after the expiration of the limited period of time in response to the tier of service being upgraded to include the existing trick play mode.

16. The set-top box of claim 15, wherein the event comprises:
a receipt of a telephone call;
a receipt of a caller identification (ID) telephone prompt;
a receipt of an electronic message; or
a receipt of a doorbell notification or a security camera notification.

17. The set-top box of claim 15, wherein the processor is further configured to enable the existing trick play mode to be activated during an enablement interval in response to the occurrence of the event.

18. The set-top box of claim 17, wherein the enablement interval comprises a prompt duration, and
wherein the processor is further configured to:
display a prompt during the prompt duration to indicate an availability of the existing feature and information relating to the event in response to the occurrence of the event;
receive an input from the user during the enablement interval in response to the displaying; and
perform the existing feature in response to receiving the input from the user.

19. The set-top box of claim 18, wherein the prompt comprises:
a telephone number and name associated with a caller identification (ID) telephone;
a live video feed from a security camera; or an instruction for the user, or
wherein the input comprises:
- an indication of a button press by the user on a remote control that is associated with the set-top box; or
- a selection of an icon by the user from video being displayed by the set-top box.

20. The set-top box of claim 15, wherein the processor is further configured to configure the set-top box to detect one or more first events from among a plurality of events and to ignore one or more second events from among the plurality of events, and
wherein the event is from among the one or more first events.

* * * * *